(12) United States Patent
Sakata (10) Patent No.: US 10,853,479 B2
(45) Date of Patent: *Dec. 1, 2020

(54) INFORMATION PROCESSING APPARATUS THAT SETS THE NUMBER OF TIMES OF PASSWORD RE-ENTRY AND PROMPTS USER TO PERFORM PASSWORD RE-ENTRY AT SET NUMBER OF TIMES

(71) Applicant: KYOCERA Document Solutions Inc., Osaka (JP)

(72) Inventor: Hiromi Sakata, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 210 days.

This patent is subject to a terminal disclaimer.

(21) Appl. No.: 15/977,386

(22) Filed: May 11, 2018

(65) Prior Publication Data

US 2018/0349596 A1 Dec. 6, 2018

(30) Foreign Application Priority Data

Jun. 2, 2017 (JP) ................................. 2017-110455

(51) Int. Cl.
*G06F 21/46* (2013.01)
*G06F 3/0488* (2013.01)
*H04L 29/06* (2006.01)

(52) U.S. Cl.
CPC .......... *G06F 21/46* (2013.01); *G06F 3/04883* (2013.01); *G06F 2221/2105* (2013.01); *G06F 2221/2117* (2013.01); *H04L 63/083* (2013.01)

(58) Field of Classification Search
CPC ........ G06F 21/608; G06F 3/02; G06F 21/562; H04L 63/083; H04L 9/3226; G06Q 30/0641

USPC ............................................................ 726/6
See application file for complete search history.

(56) References Cited

U.S. PATENT DOCUMENTS

| | | | | |
|---|---|---|---|---|
| 6,571,336 B1* | 5/2003 | Smith, Jr. | ................. | G07F 7/10 713/184 |
| 2004/0103040 A1* | 5/2004 | Ronaghi | ............ | G06Q 30/0641 705/14.69 |
| 2005/0179933 A1* | 8/2005 | Akao | .................... | G06F 21/608 358/1.14 |

(Continued)

FOREIGN PATENT DOCUMENTS

JP 2016-091333 A 5/2016

*Primary Examiner* — Bryan F Wright
(74) *Attorney, Agent, or Firm* — IP Business Solutions, LLC (57) ABSTRACT

An information processing apparatus includes a touch panel and a control unit. The control unit includes a processor that executes a control program. The control unit functions as a first setting section that, when a number of character types in a password for registration is more than a predetermined number of character types, sets a number of times of password re-entry to be more than that of a case where the number of character types in the password for registration is less than or equal to the predetermined number of character types. In addition, the control unit functions as a display control section that performs display control of a display unit, and as a practice mode execution section that causes the display unit to display a password re-entry screen on which a plurality of keys are arranged for the number of times set by the first setting section.

2 Claims, 10 Drawing Sheets

(56) References Cited

U.S. PATENT DOCUMENTS

| | | | |
|---|---|---|---|
| 2005/0262555 A1* | 11/2005 | Waterland | G06F 21/36 726/21 |
| 2005/0289645 A1* | 12/2005 | Hori | G06F 21/46 726/7 |
| 2007/0180255 A1* | 8/2007 | Hanada | G06F 21/31 713/176 |
| 2010/0192205 A1* | 7/2010 | Chaudhry | H04L 9/3226 726/5 |
| 2011/0083181 A1* | 4/2011 | Nazarov | G06F 21/562 726/23 |
| 2013/0067385 A1* | 3/2013 | Demopoulos | G06F 3/0233 715/780 |
| 2013/0127725 A1* | 5/2013 | Sugimoto | G06F 3/02 345/168 |
| 2016/0125182 A1 | 5/2016 | Miura et al. | |
| 2017/0329960 A1 | 11/2017 | Miura et al. | |
| 2018/0089406 A1* | 3/2018 | Fujiwara | G06F 21/31 |

\* cited by examiner

INFORMATION PROCESSING APPARATUS THAT SETS THE NUMBER OF TIMES OF PASSWORD RE-ENTRY AND PROMPTS USER TO PERFORM PASSWORD RE-ENTRY AT SET NUMBER OF TIMES

INCORPORATION BY REFERENCE

This application claims priority to Japanese Patent Application No. 2017-110455 filed on 2 Jun. 2017, the entire contents of which are incorporated by reference herein.

BACKGROUND

The present disclosure relates to an information processing apparatus and computer-readable non-transitory recording medium with an information processing program stored thereon, and particularly to a technique for accepting entry of a password.

A technique of restraining registration of passwords that can be easily predicted by third parties has been suggested. For example, there are known password verification systems that restrain registration of passwords that can be easily predicted by third parties, the systems including: an acceptance section that accepts entry of a password; and a determination section that determines whether or not the password accepted by the acceptance section is an easily-predictable-password to third parties.

SUMMARY

A technique improved over the aforementioned technique is proposed as one aspect of the present disclosure.

An information processing apparatus according to one aspect of the present disclosure includes an operating unit and a control unit. To the operating unit, a user enters a password for registration. The control unit includes a processor and, when the processor executes a control program, functions as: an operation acceptance section that accepts the password for registration entered to the operating unit; a practice mode execution section that executes a practice mode prompting the user to re-enter the password for registration accepted by the operation acceptance section; and a first setting section that sets a number of times of password re-entry under the practice mode in accordance with information on at least either one of a number of characters and a number of character types in the password for registration accepted by the operation acceptance section. The practice mode execution section executes processing of prompting the user to perform the password re-entry at the number of times set by the first setting section.

In a computer-readable non-transitory recording medium with an information processing program stored thereon according to another aspect of the present disclosure, the information processing program allows a computer including a processor to function, when the processor executes the information processing program, as an operation acceptance section, a practice mode execution section, and a first setting section. The operation acceptance section accepts a password for registration entered to an operating unit. The practice mode execution section executes a practice mode prompting the user to re-enter the password for registration accepted by the operation acceptance section. The first setting section sets a number of times of password re-entry under the practice mode in accordance with information on at least either one of a number of characters and a number of character types in the password for registration accepted by the operation acceptance section. The information processing program further allows the computer to function so that the practice mode execution section executes processing of prompting the user to perform the password re-entry at the number of times set by the first setting section.

DETAILED DESCRIPTION

Figure 1:
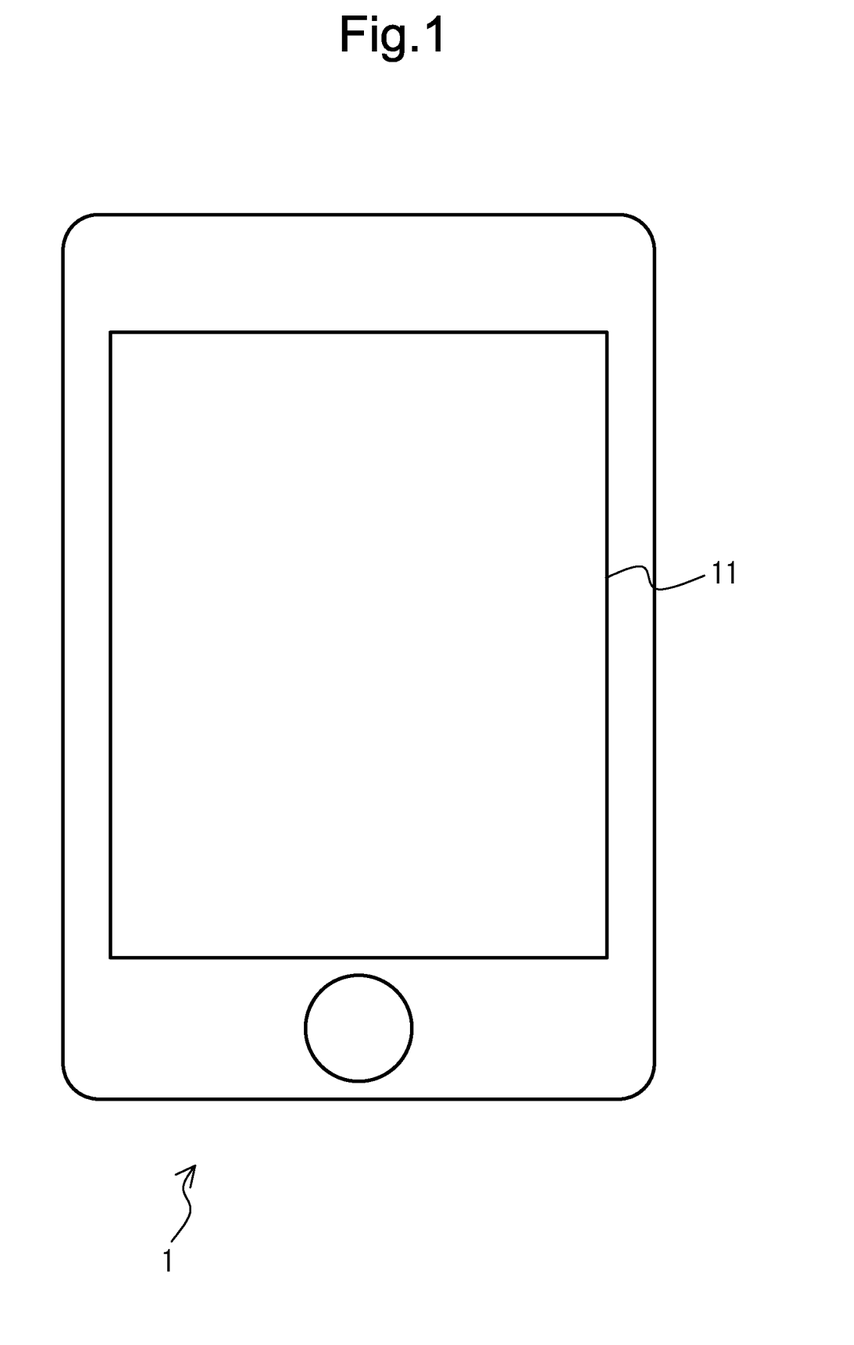
FIG. 1 is a plan view showing the appearance of an information processing apparatus according to a first embodiment of the present disclosure.
Figure 2:
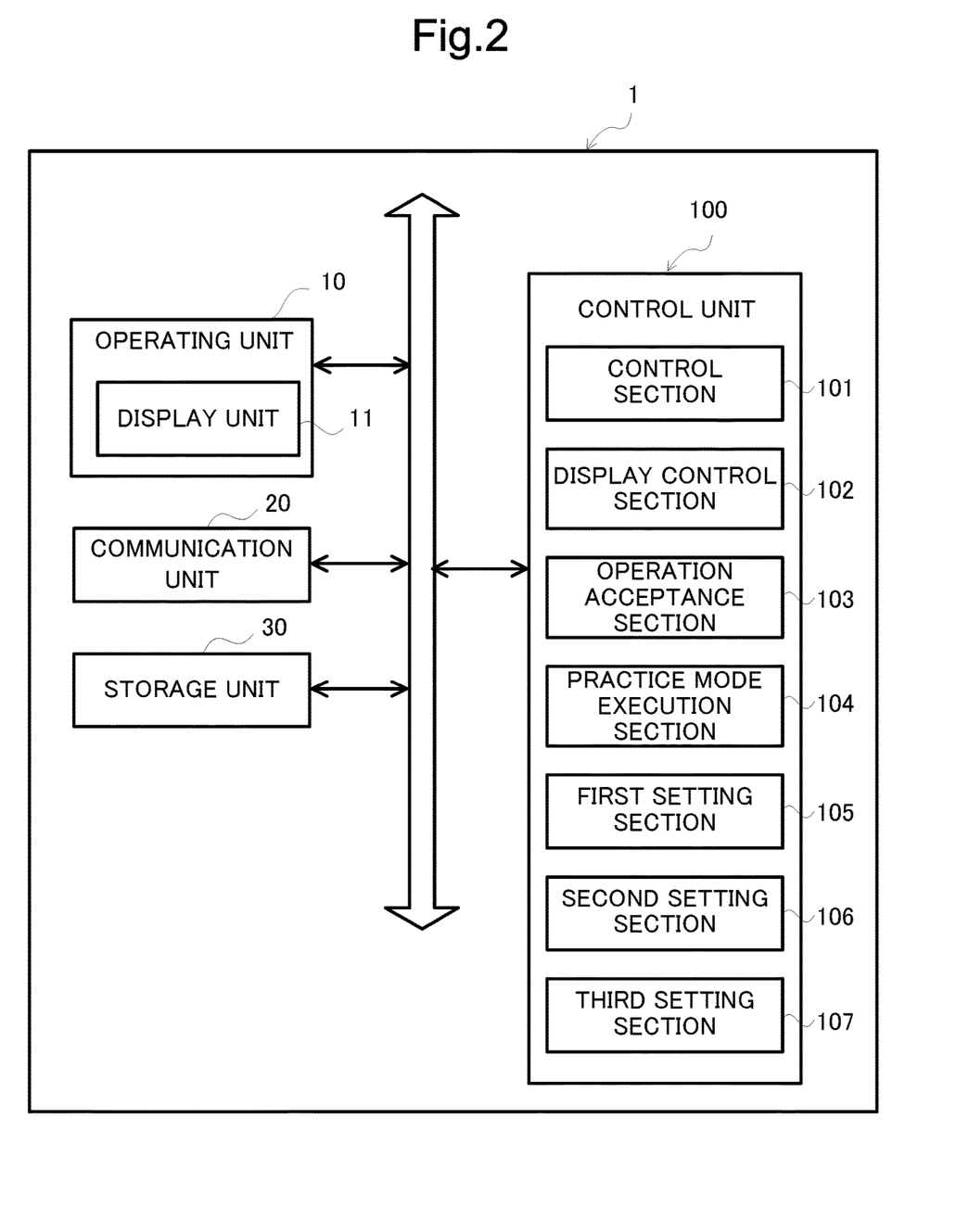
FIG. 2 is a functional block diagram schematically showing an essential part of an internal configuration of the information processing apparatus according to the first embodiment of the present disclosure.

Hereinafter, a description will be given, with reference to the drawings, on an information processing apparatus and an information processing program according to one embodiment of the present disclosure. FIG. 1 is a plan view showing the appearance of the information processing apparatus according to a first embodiment of the present disclosure. FIG. 2 is a functional block diagram schematically showing an essential part of an internal configuration of the information processing apparatus according to the first embodiment of the present disclosure.

An information processing apparatus 1 according to the first embodiment of the present disclosure is a mobile device such as a smartphone. The information processing apparatus 1 includes an operating unit 10, a communication unit 20, a storage unit 30, and a control unit 100. Each of the components can mutually transmit and receive data and signals through a communication bus.

The operating unit 10 accepts operator's instructions for various types of operations and processing executable by the information processing apparatus 1. The operating unit 10 has a display unit 11 on which operation guidance and so on for the operator are displayed. The display unit 11 has a touch panel function; the touch panel function recognizes user's touch operations performed on buttons and keys that are screen displayed. The information processing apparatus 1 may include, as the operating unit 10 to which user's operations are entered, physical keys in addition to the touch panel function.

The communication unit 20 is a communication interface including a communication module having a non-illustrated local area network (LAN) chip. The information processing apparatus 1 is connected to other electronic apparatuses such as a personal computer (PC) via a network, and exchanges data with the PC or other apparatuses connected via the communication unit 20.

The storage unit 30 is a storage device, for example a non-volatile memory.

The control unit 100 is constituted of a processor, a random-access memory (RAM), a read-only memory (ROM), and an exclusive hardware circuit. The processor may be, for example, a central processing unit (CPU), an application specific integrated circuit (ASIC), and a micro processing unit (MPU). The control unit 100 includes a control section 101, a display control section 102, an operation acceptance section 103, a practice mode execution section 104, a first setting section 105, a second setting section 106, and a third setting section 107.

When the processor executes the information processing program according to the one embodiment of the present disclosure, the information processing program being stored in the storage unit 30, the control unit 100 acts as the control section 101, the display control section 102, the operation acceptance section 103, the practice mode execution section 104, the first setting section 105, the second setting section 106, and the third setting section 107. The components of the control unit 100 may each be constituted in the form of a hardware circuit, instead of being performed according to the information processing program. This also applies to other embodiments, unless otherwise specifically noted.

The control section 101 serves to control the overall operation of the information processing apparatus 1. The control section 101 is connected to the operating unit 10, the communication unit 20, the storage unit 30, and so forth, and performs operation control of the connected components and transmits and receives signals and data among the components.

The display control section 102 performs display control of the display unit 11.

The operation acceptance section 103 accepts an instruction or information entered to the operating unit 10 by user's operation. The display unit 11 being a part of the operating unit 10 includes the touch panel function as described above. The touch panel function recognizes a contact (i.e., the user's operation) made by the user to a display screen of the display unit 11. The operation acceptance section 103 accepts the instruction or information that is entered based on the user's operation. For example, the operation acceptance section 103 accepts a password for registration entered to the operating unit 10 by the user.

The practice mode execution section 104 executes a practice mode that prompts the user to re-enter the password for registration accepted by the operation acceptance section 103. The practice mode execution section 104 executes various types of processing required to prompt the user to re-enter the password.

The first setting section 105 sets the number of times of password re-entry under the practice mode in accordance with information on the number of characters in the password for registration accepted by the operation acceptance section 103. For example, when the number of characters in the password is determined as being more than a predetermined number of characters (i.e., the password is complicated), the first setting section 105 sets the number of times of password re-entry to be more than that of the case where the number of characters in the password is less than or equal to the predetermined number of characters (details will be described later).

The second setting section 106 sets the number of times of password re-entry in accordance with an entry speed at which the user enters the password for registration to the operating unit 10. For example, when the entry speed of the password is slower than a predetermined speed, the second setting section 106 increases the number of times of password re-entry by a predetermined number of times. This is because when the entry speed of the password is slower than the predetermined speed, there is a high possibility that the user has not completely memorized the password, and a memorization degree of the password is considered to be low.

The third setting section 107 sets the number of times of password re-entry in accordance with smoothness of which the user enters the password for registration to the operating unit 10. For example, when determining that in entering individual characters constituting the password for registration, time intervals until next one character-entry is performed after one character-entry is finished have variations and are not constant, the third setting section 107 increases the number of times of password re-entry by the predetermined number of times. Here, it is assumed that when the time intervals have variations, the password entry is not smooth (i.e., there are several places where the user enters individual characters slowly). This is because also in such the case, there is a high possibility that the user has not completely memorized the password, and the memorization degree of the password is considered to be low.

Figure 3:
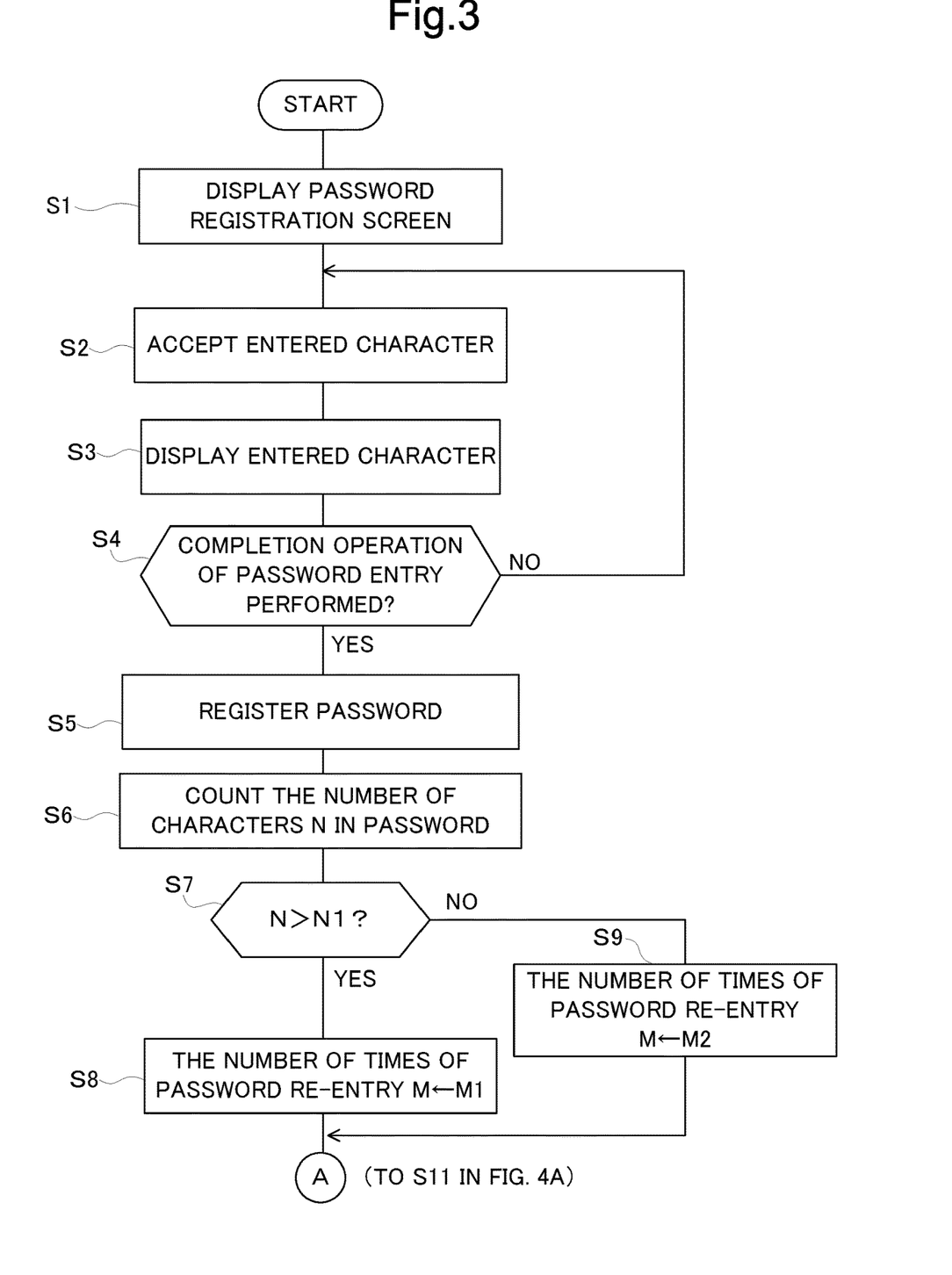
FIG. 3 is a flowchart showing an example of processing performed by the information processing apparatus according to the first embodiment of the present disclosure.
Figure 4A:
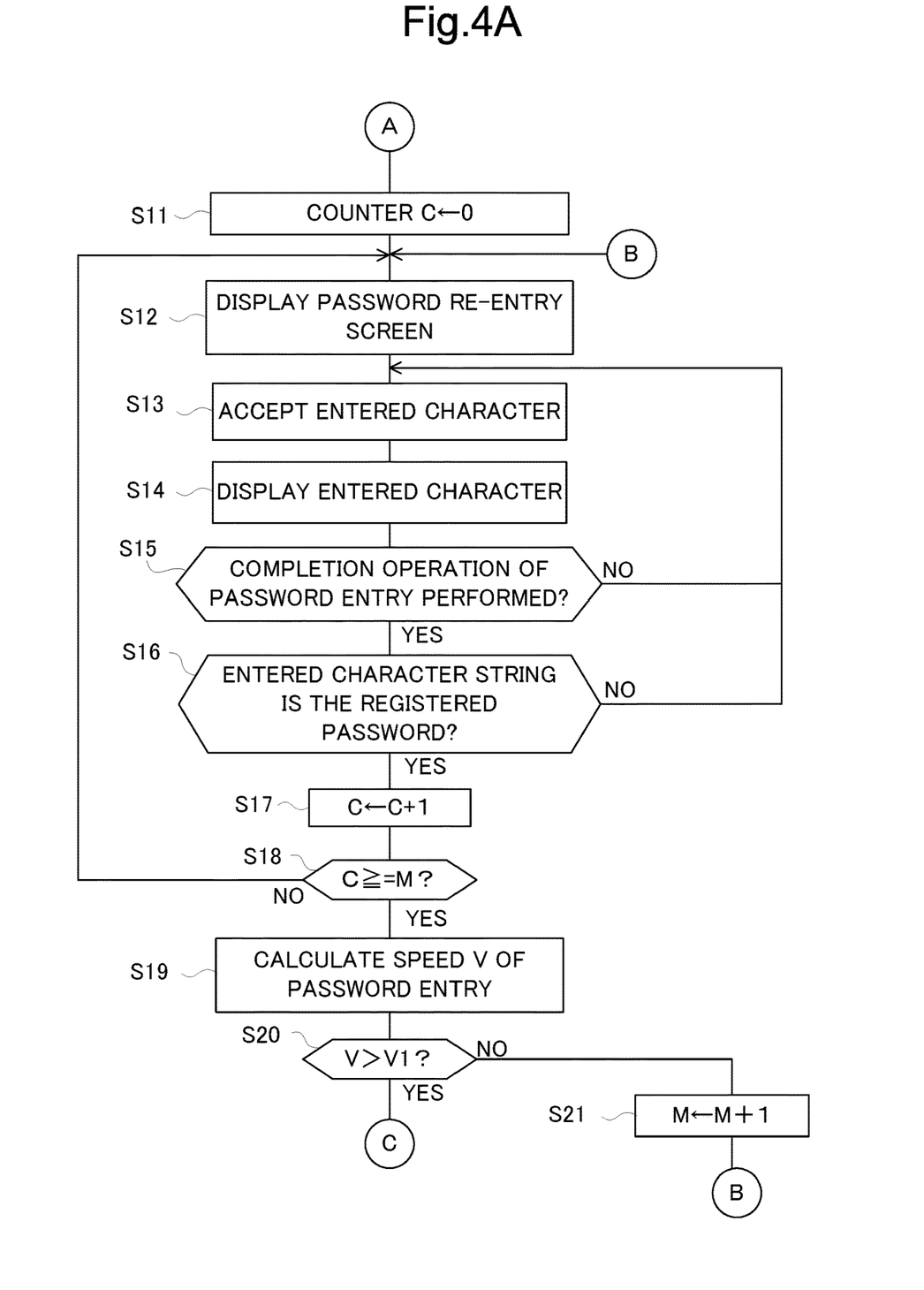
FIG. 4A is a flowchart showing an example of processing performed by the information processing apparatus according to the first embodiment of the present disclosure.
Figure 4B:
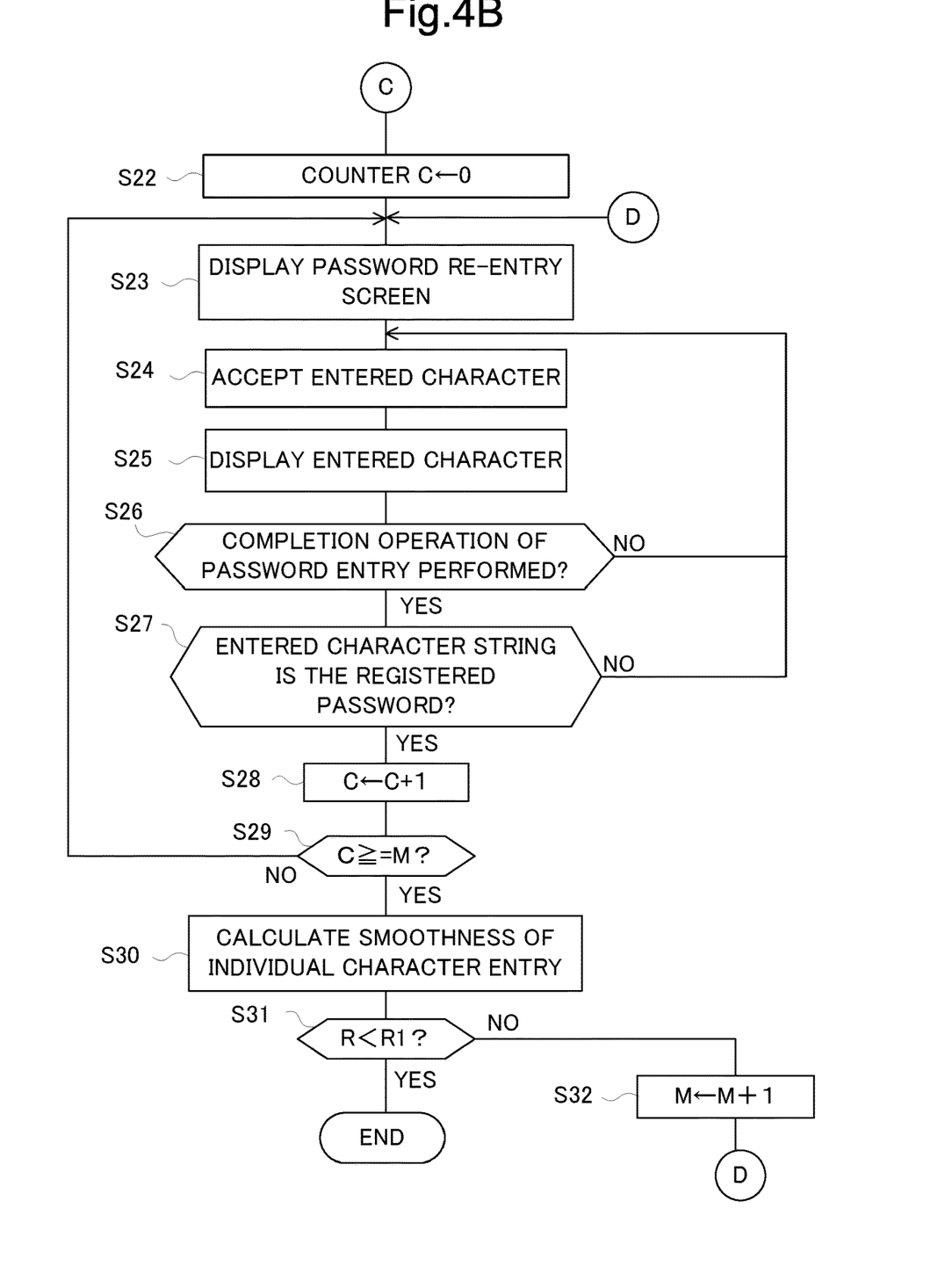
FIG. 4B is a flowchart showing an example of processing performed by the information processing apparatus according to the first embodiment of the present disclosure.

An example of processing performed by the control unit 100 included in the information processing apparatus 1 according to the first embodiment will be detailed next with reference to flowcharts shown in FIG. 3, FIG. 4A, and FIG. 4B. The subjected processing is performed when the operation acceptance section 103 accepts the user's operation for instructing a registration of a password performed through the operating unit 10.

Figure 5A:
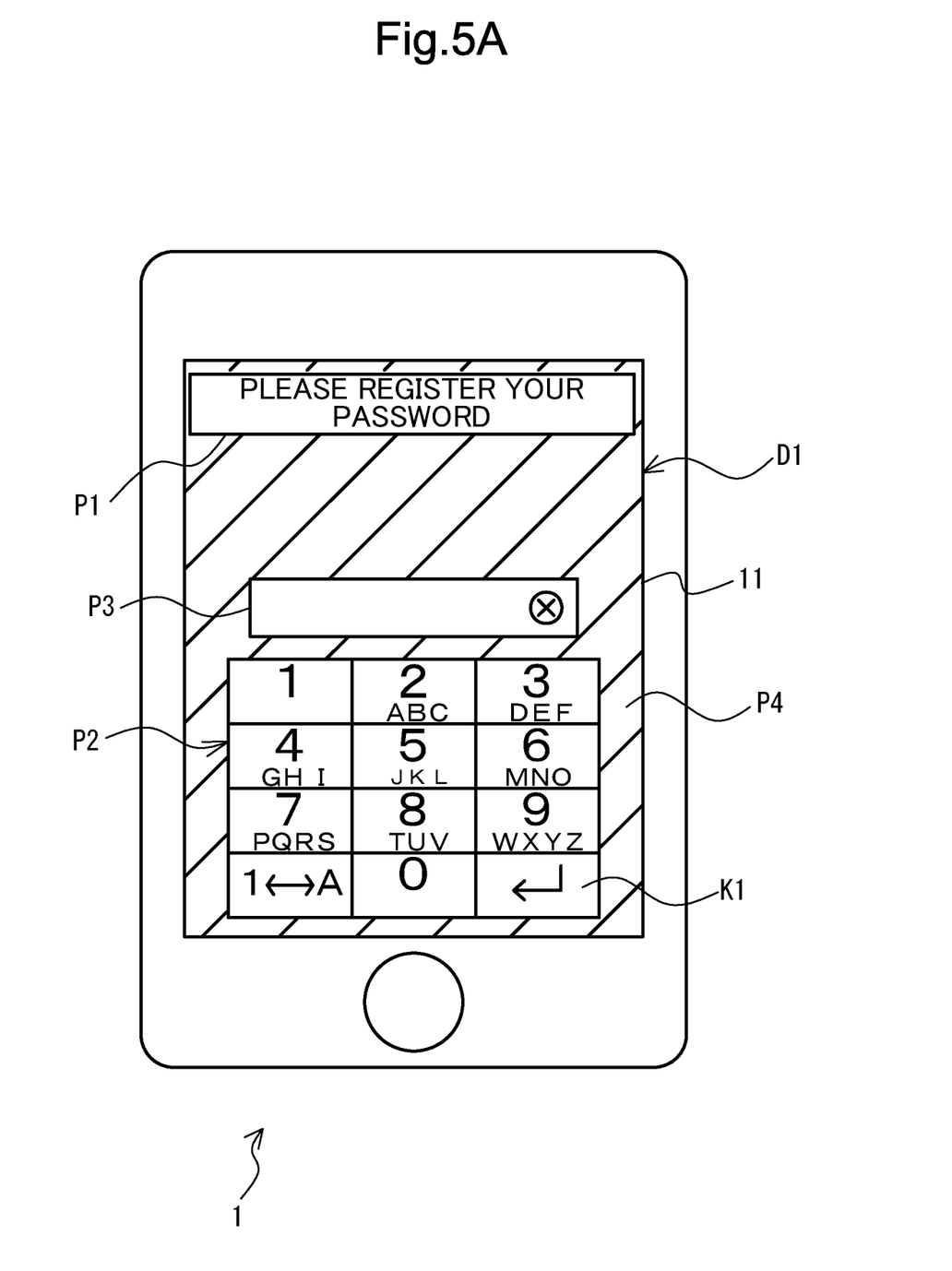
FIG. 5A is a diagram showing an example of a display screen displayed on a display unit.
Figure 5B:
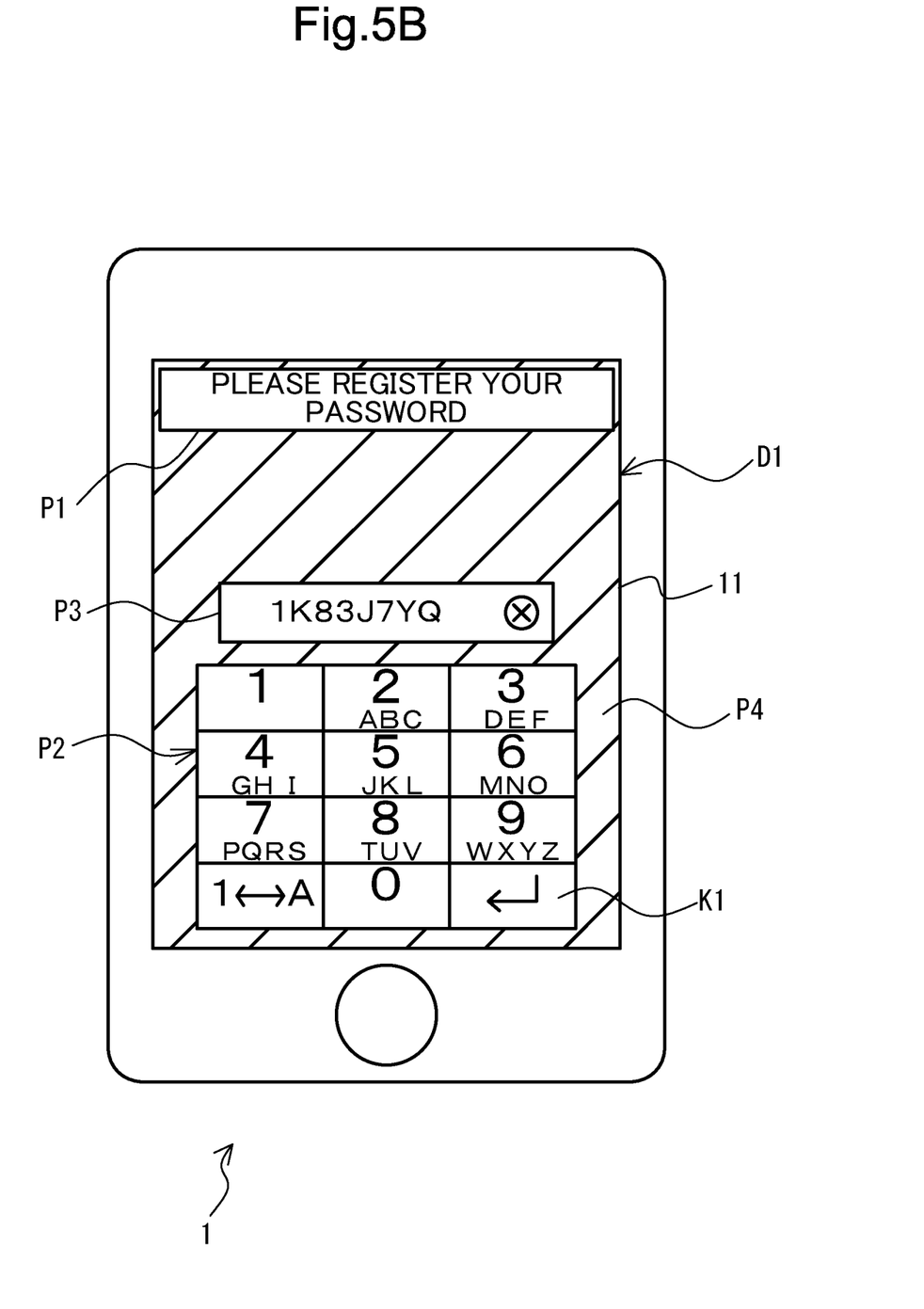
FIG. 5B is a diagram showing an example of the display screen displayed on the display unit.

When the operation acceptance section 103 accepts the user's operation, the display control section 102 allows the display unit 11 to display a password registration screen D1 (FIG. 5A) on which a plurality of keys is displayed (step S1). FIGS. 5A and 5B are diagrams showing examples of the password registration screen D1 to be displayed on the display unit 11. As shown in FIG. 5A, the password registration screen D1 includes: a message part P1 showing a message "PLEASE REGISTER YOUR PASSWORD"; a key arrayed part P2 where the plurality of keys (such as ten keys of 0 to 9 for entry of alphanumeric characters, and an enter-key K1) are arrayed; an entry character display part P3 that displays characters that are entered based on an operation performed on the keys displayed on the key arrayed part P2; and a background image P4.

The operating unit 10 recognizes the user's operation performed on one of the keys arrayed on the key arrayed part P2 and transmits, to the operation acceptance section 103, an alphanumeric character (hereinafter referred to as character) corresponding to the key displayed on the position where the user's operation was recognized. The operation acceptance section 103 accepts the character transmitted from the operating unit 10 (step S2). As shown in the example in FIG. 5B, the display control section 102 displays, on the entry character display part P3, the individual characters the entry of which has been accepted by the operation acceptance section 103 (step S3).

The control section 101 then determines whether or not the operation acceptance section 103 accepted the operation performed on the enter-key K1 (i.e., a completion operation of password entry), the enter-key K1 being arranged in the lower right corner of the key arrayed part P2 (step S4). When determining that the operation acceptance section 103 accepted the operation performed on the enter-key K1 (YES in step S4), the control section 101 registers, onto the storage unit 30, as the password for registration, a plurality of characters (hereinafter referred to as a character string) the entry of which has been accepted by the operation acceptance section 103 (step S5). When the control section 101 determines that the operation acceptance section 103 has not accepted the operation performed on the enter-key K1 (NO in step S4), the process goes back to step S2.

After the control section 101 registered the password for registration onto the storage unit 30, the first setting section 105 counts the number of characters N in the password for registration accepted by the operation acceptance section 103 (step S6). The first setting section 105 determines whether or not the number of characters N acquired by counting is more than a predetermined number of characters N1 (for example, six characters) (step S7).

When the first setting section 105 determines that the number of characters N is more than the predetermined number of characters N1 (in the above example, the number of characters in the password for registration is seven or more) (YES in step S7), the first setting section 105 sets the number of times of password re-entry M under the practice mode to a predetermined number of times M1 (for example, three times) (step S8). The process then goes to step S11 (FIG. 4A) and the practice mode execution section 104 executes the practice mode.

On the other hand, when the first setting section 105 determines that the number of characters N is the predetermined number of characters N1 or less (NO in step S7), the first setting section 105 sets the number of times of password re-entry M under the practice mode to a predetermined number of times M2 (M2<M1; for example, M2 is two times) (step S9). The process then goes to S11 (FIG. 4A).

In another embodiment, the first setting section 105 may set the number of times of password re-entry M under the practice mode not in accordance with the number of characters in the password for registration accepted by the operation acceptance section 103, but in accordance with information on the number of character types. For example, when the password is the character string constituted of one kind (either numerals or English alphabets), the first setting section 105 sets the number of times of password re-entry M to two times, that is the number of times M2 (being as the relatively small number of times); when the password is the character string constituted of two kinds (both numerals and English alphabets), the first setting section 105 sets the number of times of password re-entry M to three times, that is the number of times M1 (being as the relatively large number of times). In other words, when the number of character types in the password is more than a predetermined number of character types, the first setting section 105 sets the number of times of password re-entry to be more than that of the case where the number of character types in the password is less than or equal to the predetermined number of character types.

In still another embodiment, the first setting section 105 may set the number of times of password re-entry M under the practice mode in accordance with information on the number of characters and the number of character types in the password for registration accepted by the operation acceptance section 103. For example, when the number of characters N in the password, the character types of which is one kind, is six or less, the first setting section 105 sets the number of times of password re-entry M to two times, that is the number of times M2 (being as the relatively small number of times); when the number of characters N in the password, the character types of which is one kind, is seven or more, the first setting section 105 sets the number of times of password re-entry M to three times. Furthermore, when the number of characters N in the password, the character types of which is two kinds, is six or less, the first setting section 105 sets the number of times of password re-entry M to three times, that is the number of times M1 (being as the relatively large number of times); when the number of characters N in the password, the character types of which is two kinds, is seven or more, the first setting section 105 sets the number of times of password re-entry M to four times, that is the number of times M2' (being as still larger number of times).

In step S11 (FIG. 4A), the practice mode execution section 104 resets a counter C for use of counting the number of execution times of password re-entry to 0 (step S11). The practice mode execution section 104 allows the display control section 102 to allow the display unit 11 to display a password re-entry screen D2 (FIG. 6) on which the plurality of keys is arranged (step S12). This process prompts the user to perform the password re-entry and the practice mode is started.

Figure 6:
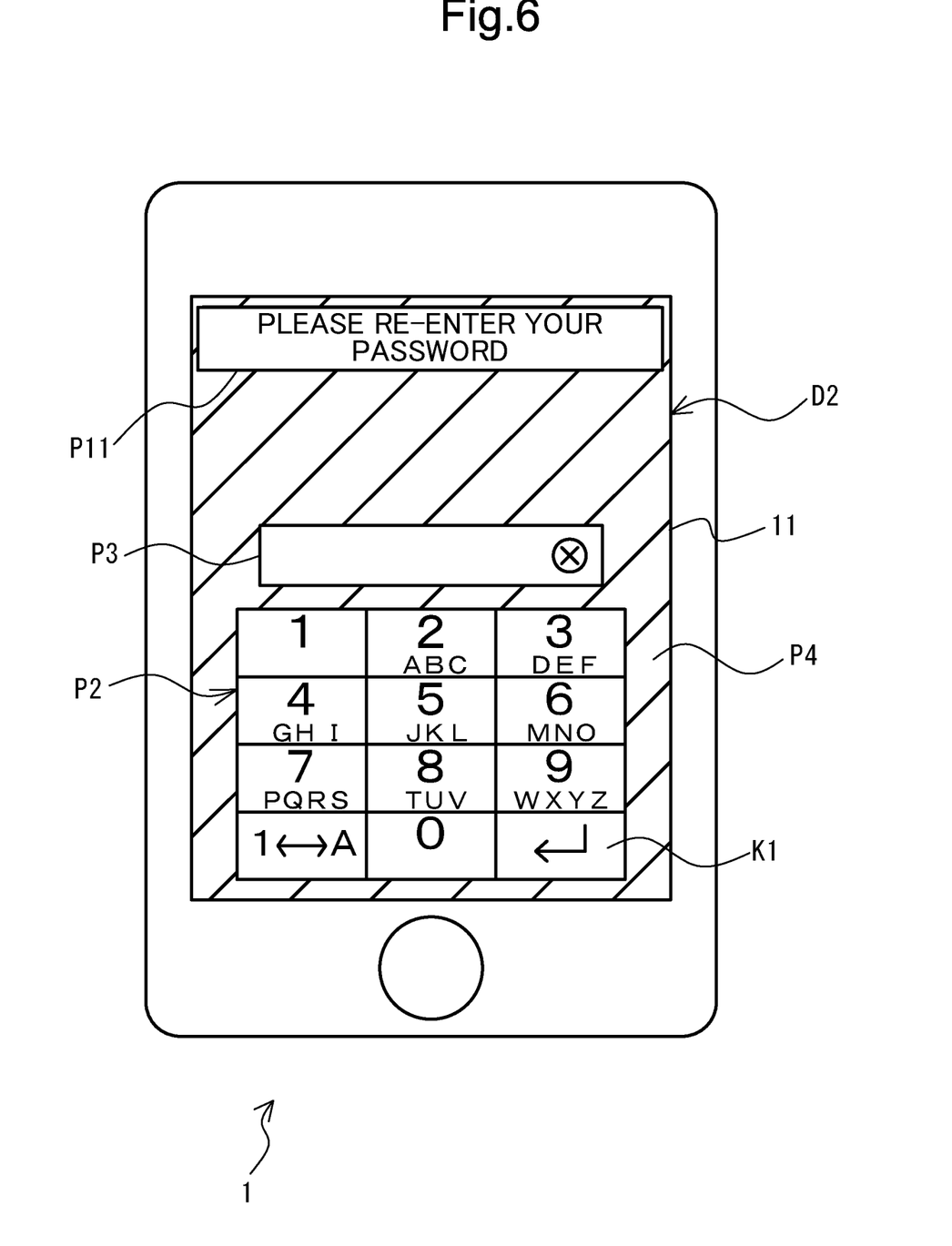
FIG. 6 is a diagram showing an example of the display screen displayed on the display unit.

FIG. 6 is a diagram showing an example of the password re-entry screen displayed on the display unit 11. The password re-entry screen D2 includes: a message part P11 showing a message "PLEASE RE-ENTER YOUR PASSWORD"; the key arrayed part P2; the entry character display part P3; and the background image P4.

When the operating unit 10 recognizes user's operation performed on one of the keys arrayed on the key arrayed part P2 and transmits the corresponding character to the operation acceptance section 103 then the operation acceptance section 103 accepts the character transmitted from the operating unit 10 (step S13), the display control section 102 displays, on the entry character display part P3, the individual characters the entry of which has been accepted by the operation acceptance section 103 (step S14). The practice mode execution section 104 determines whether or not the operation acceptance section 103 accepted the operation performed on the enter-key K1 (i.e., a completion operation of password entry) (step S15).

When determining that the operation acceptance section 103 accepted the operation performed on the enter-key K1 (YES in step S15), the practice mode execution section 104 determines whether or not the character string accepted in step S13 conforms to the password for registration registered in step S5 (step S16). In the case of NO in step S15, the process goes back to step S13.

When determining that the character string accepted in step S13 conforms to the password for registration registered in step S5 (YES in step S16), re-entry of the password for registration is considered as having been performed for one time, so that the practice mode execution section 104 adds 1 to the counter C (step S17) and then determines whether or not the counter C has reached the number of times of password re-entry M (step S18). When the practice mode execution section 104 determines that the character string accepted in step S13 does not conform to the password for registration registered in step S5 (NO in S16), the process goes back to step S13.

When the practice mode execution section 104 determines that the counter C has not yet reached the number of times of password re-entry M (NO in step S18), the process goes back to step S12, and the process from step S12 to step S17 are repeatedly performed until the practice mode execution section 104 determines in step S18 that the counter C has reached the number of times of password re-entry M.

When the practice mode execution section 104 determines that the counter C has reached the number of times of password re-entry M (YES in step S18), it is considered that the user has performed the re-entry of the password for registration for the number of times of password re-entry M, so that the process goes to step S19.

In step S19, for the password accepted in step S13, the second setting section 106 calculates a speed V of its entry. For example, for each of the password entry performed M times, the second setting section 106 measures, with a timer incorporated in the control unit 100, a time required from when the first character is entered and the operation reception unit 103 accepted the entry in step S13 to when the last character is entered and the operation reception unit 103 accepted the entry. The second setting section 106 then calculates in step S19, as the speed V for the password entry, the average value of the time required for the password entry having been measured.

The second setting section 106 determines whether or not the speed V calculated in step S19 is faster than a predetermined speed V1 (step S20), and when it is determined that the speed V is faster than the predetermined speed V1 (YES in step S20), the process goes to step S22.

On the other hand, when the second setting section 106 determines that the speed V calculated in step S19 is the predetermined speed V1 or slower (NO in step S20), the second setting section 106 increases the number of times of password re-entry M by the predetermined number of times (here, as an example, one time) (step S21), and the process goes back to step S12. In other words, when the speed V calculated in step S19 is slow, the number of times of password re-entry is increased, thus the period of the practice mode is extended.

In step S22 (FIG. 4B), the practice mode execution section 104 resets the counter C to 0 (step S22) and allows the display control section 102 to allow the display unit 11 to display again the password re-entry screen D2 on which the plurality of keys is arranged (FIG. 6) (step S23). This prompts the user to re-enter the password.

When the operating unit 10 recognizes user's operation performed on the keys arrayed on the key arrayed part P2 and transmits the corresponding characters to the operation acceptance section 103, and the operation acceptance section 103 accepts the character transmitted from the operating unit 10 (S24), the display control section 102 displays, on the entry character display part P3, the individual characters the entry of which has been accepted by the operation acceptance section 103 (step S25).

Then, when determining that the operation acceptance section 103 accepted the operation performed on the enter-key K1 (YES in step S26), the practice mode execution section 104 determines whether or not the character string accepted in step S24 conforms to the password for registration registered in step S5 (step S27). In the case of NO in step S26, the process goes back to step S24.

When determining that the character string accepted in step S24 conforms to the password for registration registered in step S5 (YES in step S27), the practice mode execution section 104 adds 1 to the counter C (step S28) and determines whether or not the counter C has reached the number of times of password re-entry M (step S29). The number of times of password re-entry M here is the number of times of password re-entry M having been set in step S8 or step S9. However, the number of times of password re-entry M set in step S21 may be used.

When the practice mode execution section 104 determines that the character string accepted in step S24 does not conform to the password for registration accepted in step S5 (NO in step S27), the process goes back to step S24.

Here, when the practice mode execution section 104 determines that the counter C has not yet reached the number of times of password re-entry M (NO in step S29), the process goes back to step S23, and the process from step S23 to step S28 are repeatedly performed until the practice mode execution section 104 determines in step S29 that the counter C has reached the number of times of password re-entry M.

When the practice mode execution section 104 determines that the counter C has reached the number of times of password re-entry M (YES in step S29), the process goes to step S30.

In step S30, the third setting section 107 calculates the smoothness of which the user enters the password for registration to the operating unit 10 (step S30). For example, with respect to the password entry performed M times, in each of the character strings entered as the passwords, the third setting section 107 calculates, at the time of the processing in step S24, time intervals T between each of all the characters constituting the character strings. Each of the time intervals T represents an interval between the time when one character is entered and the entry of which is accepted by the operation reception unit 103 and the time when the next one character is entered and the entry of which is accepted by the operation reception unit 103. Then in step S30, the third setting section 107 calculates, as the smoothness in the password entry, a variability rate R. The variability rate R is a rate about the time intervals T among each of all the characters in the respective character strings entered for M times.

For example, the third setting section 107 calculates a difference between the maximum value and the minimum value in all the time intervals T and calculates, as the variability rate R, the ratio of the difference with respect to the minimum value. For example, in the case where the maximum value in the time intervals T is 1.4 seconds and the minimum value in the time intervals T is 0.8 seconds, variability rate R becomes 75% (=((1.4−0.8))/0.8).

The third setting section 107 then determines whether or not the variability rate R is smaller than a predetermined variability rate R1 (step S31), and when determining that the variability rate R is smaller than the predetermined variability rate R1 (YES in step S31), the process is ended.

On the other hand, when the third setting section 107 determines that the variability rate R is the predetermined variability rate R1 or higher (NO in step S31), the third setting section 107 increases the number of times of password re-entry M by the predetermined number of times (here, as an example, one time) (step S32), and the process goes back to step S23. In other words, when variability rate R calculated in the step S30 is high, the number of times of password re-entry is increased, thus the period of the practice mode is extended.

The high variability rate R indicates that when the individual characters constituting the password for registration are being entered by the user, the time intervals until next one character-entry is performed after one character-entry is finished have variations and are not constant, and the password entry is not smooth (i.e., there are several places where the user enters individual characters slowly). In such the case, the period of the practice mode is extended because there is a high possibility that the user has not completely memorized the password, and the memorization degree of the password is considered to be low.

For security reasons, it is important to restrain registrations of passwords that can be easily predicted by third parties. However, because hard-to-be-predicted passwords tend to have not much information that can help users to memorize the passwords and are complicated, it is difficult to memorize. For this reason, there is a problem that such the passwords become a factor that the user (the person who registered the password) forgets the password.

The first embodiment executes the practice mode that prompts the user to re-enter the password for registration, enabling the user to practice memorizing the password by the simple act of re-entering the password.

In addition, when the practice mode that prompts the user to re-enter the password for registration is executed, the number of times of password re-entry is set in accordance with information on at least either one of the number of characters and the number of character types in the password for registration, so that it is possible to increase the number of memorization practices for the password having the large number in at least either one of characters and character types (i.e., for the complicated password) in accordance with the degree of difficulty of the password. Therefore, the memorization practices in accordance with the complexity can be performed even for hard-to-be-predicted complicated passwords, so that it is possible to effectively prevent users from forgetting passwords.

Furthermore, the user's memorization degree of the password is determined on the basis of the speed of the password entry or the smoothness in the password entry and the number of practice for the password entry is added in accordance with the memorization degree of the password. Therefore, it is possible to impose enough practice for password memorization on the user.

Figure 7:
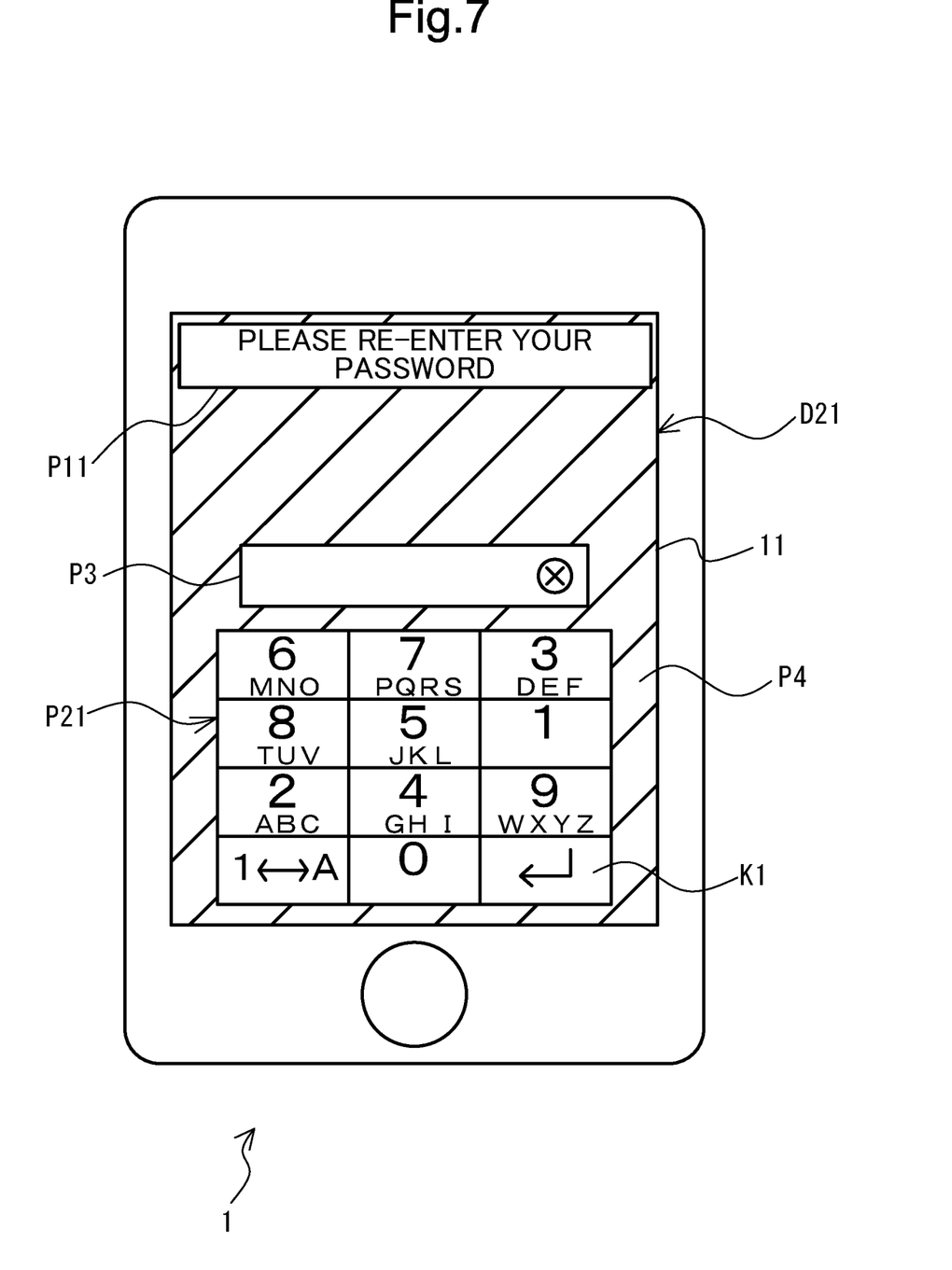
FIG. 7 is a diagram showing an example of the display screen displayed on the display unit.

In the first embodiment, descriptions are given taking the case where the display control section 102 allows the display unit 11 to display in step S12 and step S23 (FIGS. 4A and 4B) the password re-entry screen D2 (FIG. 6) on which the plurality of keys is arranged. In accordance with a second embodiment, every time the display control section 102 allows the display unit 11 to display the password re-entry screen D2, the display control section 102 may randomly change the array of the plurality of keys (10 keys of 0 to 9). For example, as shown in FIG. 7, the display control section 102 may allow the display unit 11 to display the password re-entry screen D21 having the key arrayed part P21 where the array of the plurality of keys is changed. This arrangement enables the user to practice the password entry regardless of environmental quality and accordingly, the memorization degree of the password is promoted.

Furthermore, in accordance with a third embodiment, every time the display control section 102 allows the display unit 11 to display the password re-entry screen D2, the background image P4 concurrently displayed on the display unit 11 with the key arrayed part P2 may be changed. This arrangement also enables the user to practice the password entry regardless of environmental quality and accordingly, the memorization degree of the password is promoted.

The display control section 102 may also use, as the background image, an image having a character string similar to the character string of the password for registration accepted by the operation acceptance section 103 (i.e., similar to the password having been registered on the storage unit 30). In this case, the display control section 102 generates, for example, an image having: a character string in which the order of all or a part of the character string of the password for registration is exchanged; and a character string in which the character string of the password for registration is partially replaced with another character. Then, the display control section 102 allows the display unit 11 to display, as the background image, the generated image.

Figure 8:
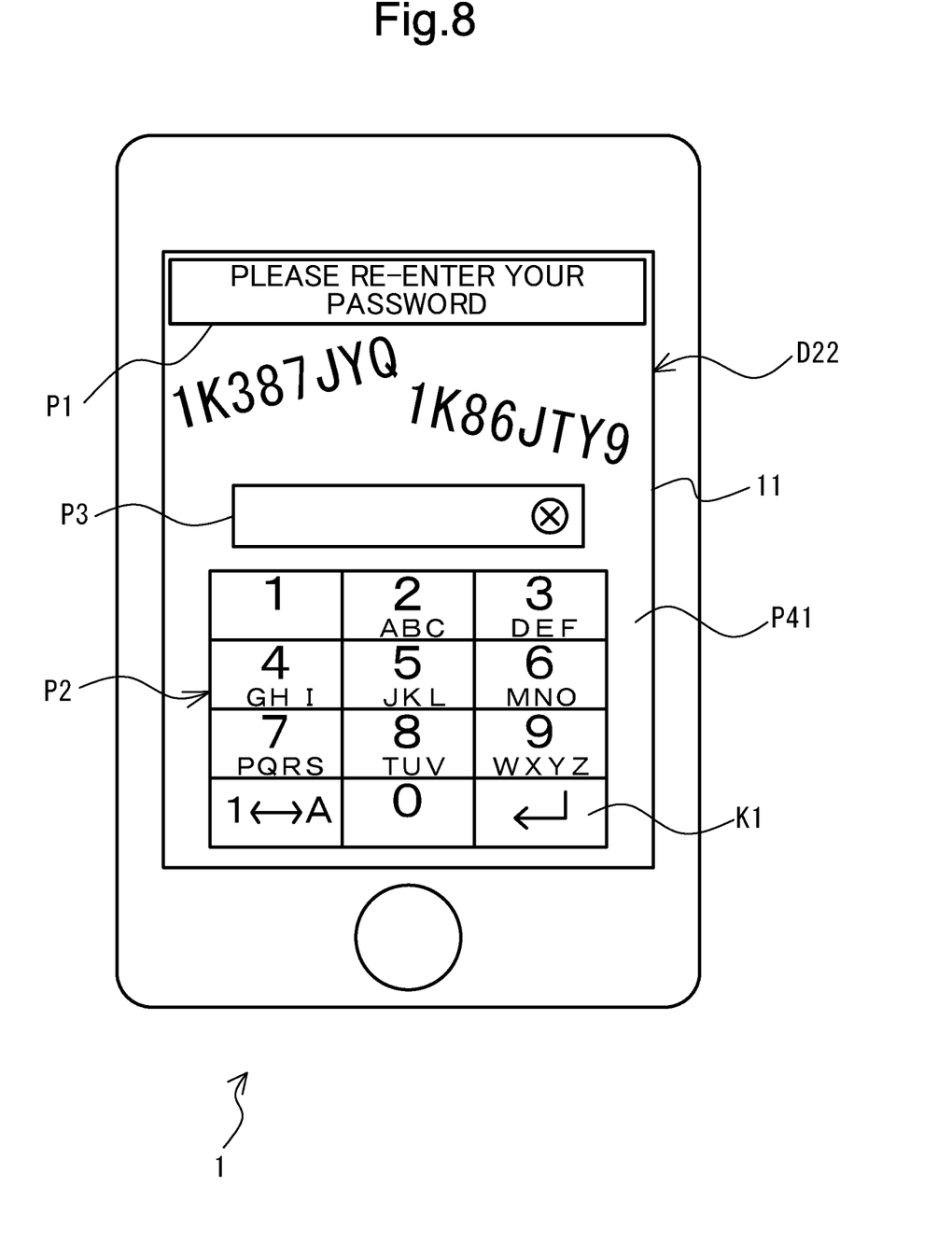
FIG. 8 is a diagram showing an example of the display screen displayed on the display unit.

For example, when the password for registration is "1K83J7YQ" as shown in FIG. 8, the display control section 102 sets an image having the character string similar to the character string of the password for registration, such as "1K387JYQ" and "1K86JTY9", as the background image P41 and allows the display unit 11 to display the password re-entry screen D22 having the background image P41.

The present disclosure is not limited to the above embodiments and can be modified in various ways. Although the description of the above embodiments is given taking a smartphone as an example of the information processing apparatus according to the present disclosure, the example is merely illustrative and the information processing apparatus may be any other electric devices, for example, an ATM, a mobile phone, an electronic tablet, and an image forming apparatus such as a multifunction peripheral.

The information processing program detailed in the above embodiments may be stored in a computer-readable non-transitory recording medium such as a hard disc, a CD-ROM, a DVD-ROM, and a semiconductor memory.

The configurations and processing shown in the above embodiments with reference to FIG. 1 to FIG. 8 are merely illustrative of the present disclosure and the present disclosure is not intended to be limited to the above configurations and processing.

While the present disclosure has been described in detail with reference to the embodiments thereof, it would be apparent to those skilled in the art the various changes and modifications may be made therein within the scope defined by the appended claims.

What is claimed is:

1. An information processing apparatus comprising:
a touch panel to which a user enters a password for registration; and
a control unit that includes a processor and, when the processor executes a control program, functions as:
an operation acceptance section that accepts the password for registration entered to the touch panel;
a practice mode execution section that executes a practice mode prompting the user to re-enter the password for registration accepted by the operation acceptance section; and
a first setting section that sets a number of times of password re-entry under the practice mode in accordance with a number of character types in the password for registration accepted by the operation acceptance section,
wherein the practice mode execution section executes processing of prompting the user to perform the password re-entry at the number of times set by the first setting section, and
when the number of character types in the password for registration is more than a predetermined number of character types, the first setting section sets the number of times of password re-entry to be more than that of a case where the number of character types in the password for registration is less than or equal to the predetermined number of character types.

2. An information processing apparatus comprising:
a touch panel to which a user enters a password for registration;
a display unit that includes the touch panel; and a control unit that includes a processor and, when the processor executes a control program, functions as:
- an operation acceptance section that accepts the password for registration entered to the touch panel;
- a practice mode execution section that executes a practice mode prompting the user to re-enter the password for registration accepted by the operation acceptance section;
- a first setting section that sets a number of times of password re-entry under the practice mode in accordance with information on at least either one of a number of characters and a number of character types in the password for registration accepted by the operation acceptance section; and
- a display control section that performs display control of the display unit, wherein the practice mode execution section executes processing of prompting the user to perform the password re-entry at the number of times set by the first setting section, the display control section allows the display unit to display a plurality of keys used for password entry, the operation acceptance section accepts user's entry of the password for the registration performed through the plurality of keys by using the touch panel, and the practice mode execution section allows the display control section to allow the display unit to display a password re-entry screen on which the plurality of keys are arranged for the number of times set by the first setting section, thereby prompting the user to perform the password re-entry at the number of times set by the first setting section.

* * * * *